(12) United States Patent
Ji et al.

(10) Patent No.: US 11,611,642 B2
(45) Date of Patent: Mar. 21, 2023

(54) MOBILE TERMINAL, HOUSING, AND METHOD FOR MANUFACTURING HOUSING

(71) Applicant: GUANGDONG OPPO MOBILE TELECOMMUNICATIONS CORP., LTD., Guangdong (CN)

(72) Inventors: Bin Ji, Guangdong (CN); Quanhao Wen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 39 days.

(21) Appl. No.: 17/508,922

(22) Filed: Oct. 22, 2021

(65) Prior Publication Data

US 2022/0046120 A1 Feb. 10, 2022

Related U.S. Application Data

(63) Continuation of application No. PCT/CN2020/080399, filed on Mar. 20, 2020.

(30) Foreign Application Priority Data

Apr. 24, 2019 (CN) .................... 201910332296.X (51) Int. Cl.
  *H04B 1/38* (2015.01)
  *H04M 1/02* (2006.01)
(52) U.S. Cl.
  CPC ....... *H04M 1/0249* (2013.01); *H04M 1/0266* (2013.01)
(58) Field of Classification Search
  CPC ............. H04M 1/0249; H04M 1/0266; H04M 1/0254; H04M 1/026; H04M 1/0268
  See application file for complete search history.

(56) References Cited

U.S. PATENT DOCUMENTS

2014/0100005 A1 4/2014 Bae et al.
2016/0079663 A1* 3/2016 Youm .................... H01Q 1/243
                                                    343/702
(Continued)

FOREIGN PATENT DOCUMENTS

CN    101909410    12/2010
CN    102202471    9/2011
(Continued)

OTHER PUBLICATIONS

EPO, Extended European Search Report for EP Application No. 20796205.1, dated May 18, 2022.
(Continued)

*Primary Examiner* — Tuan Pham
(74) *Attorney, Agent, or Firm* — Hodgson Russ LLP (57) ABSTRACT

The disclosed are a mobile terminal, a housing therefor, and a method for manufacturing the housing. The housing includes a transparent main body formed integrally. The transparent main body has an outer surface and an inner surface opposite to each other and includes a flat plate portion and a side portion connected with each other, the side portion is disposed at a periphery of the flat plate portion, and a through hole is provided in the side portion. The outer surface of the transparent main body is provided with a light-shielding layer jointed with a side wall of the through hole. An orthographic projection area of the side wall of the through hole on a reference plane is located within an orthographic projection area of the light-shielding layer on the reference plane, and the reference plane is a geometric plane in parallel with the flat plate portion.

20 Claims, 7 Drawing Sheets

(56) References Cited

U.S. PATENT DOCUMENTS

2016/0142522 A1* 5/2016 Kim .................. A45C 11/00
                                                   455/575.8
2017/0300142 A1* 10/2017 Zeng .................. G02B 6/005
2018/0199458 A1    7/2018 Hsu et al.

FOREIGN PATENT DOCUMENTS

| CN | 102469712  | 5/2012  |
|----|------------|---------|
| CN | 102729713  | 10/2012 |
| CN | 103442531  | 12/2013 |
| CN | 106506755  | 3/2017  |
| CN | 106603775  | 4/2017  |
| CN | 106774650  | 5/2017  |
| CN | 107580090  | 1/2018  |
| CN | 207897243  | 9/2018  |
| CN | 108737595  | 11/2018 |
| CN | 208723997  | 4/2019  |
| WO | 2016104161 | 6/2016  |

OTHER PUBLICATIONS

CNIPA, Notification to Grant Patent Right for Invention for CN Application No. 201910332296.X, dated Jan. 28, 2021.
WIPO, Written Opinion and International Search Report for PCT/CN2020/080399, dated Jun. 11, 2020.

\* cited by examiner

MOBILE TERMINAL, HOUSING, AND METHOD FOR MANUFACTURING HOUSING

CROSS-REFERENCE TO RELATED APPLICATIONS

This application a continuation of International Application No. PCT/CN2020/080399, filed Mar. 20, 2020, which claims priority to Chinese Patent Application No. 201910332296.X, filed Apr. 24, 2019, the entire disclosures of which are incorporated herein by reference.

TECHNICAL FIELD

The present disclosure relates to the field of mobile terminals, and in particular to a mobile terminal, a housing, and a method for manufacturing the housing.

BACKGROUND

As consumers tend to care for the overall appearance and texture of mobile terminals such as mobile phones, it is particularly important to improve the appearance and texture of a housing which occupies a large part of an outer surface of the mobile terminal. At present, some housings are designed as transparent structures to show a good luster. However, the transparent housings have some problems. For example, on the transparent housing, holes corresponding to an earphone jack, a button or a charging interface are provided, a side wall of each of the hole passes through the transparent housing and thus a bright spot or light-spot is formed on the surface of the transparent housing, which affects the overall appearance and texture of the transparent housing and the respective mobile terminal.

SUMMARY

In one aspect, a housing for a mobile terminal is provided in the embodiments of the present disclosure. The housing includes a transparent main body and a light-shielding layer. The transparent main body has an outer surface and an inner surface opposite to each other. The transparent main body includes a flat plate portion and a side portion connected with each other. The side portion is disposed at a periphery of the flat plate portion, and encloses the flat plate portion. The side portion is provided with a through hole penetrating both the inner surface and the outer surface. The light-shielding layer is provided at the outer surface of the transparent main body, and the light-shielding layer is located around the through hole. An end of side wall of the through hole that is away from the inner surface is connected to the light-shielding layer. An orthographic projection area of the side wall of the through hole on a reference plane is located within an orthographic projection area of the light-shielding layer on the reference plane, and the reference plane is a geometric plane in parallel with the flat plate portion.

In another aspect, a method for manufacturing the housing is provided in the embodiments of the present disclosure. The method includes: providing a transparent main body. The transparent main body has an outer surface and an inner surface opposite to each other. The transparent main body includes a flat plate portion and a side portion connected with each other, and the side portion is disposed at a periphery of the flat plate portion and encloses the flat plate portion. The method further includes: providing a light-shielding layer at the outer surface of the transparent main body; and providing a through hole in the side portion. The through hole penetrates both the inner surface and the outer surface. The light-shielding layer is located around the through hole, and an end of a side wall of the through hole that is away from the inner surface is connected to the light-shielding layer. An orthographic projection area of the light-shielding layer on a reference plane covers an orthographic projection area of the side wall of the through hole on the reference plane, and the reference plane is a geometric plane in parallel with the flat plate portion.

In further aspect, a mobile terminal is provided in the embodiments of the present disclosure. The mobile terminal includes a display screen and the housing mentioned above. The display screen is installed on the housing.

BRIEF DESCRIPTION OF THE DRAWINGS

In order to clearly illustrate the technical solutions in the embodiments of the present disclosure or the related art, drawings used in the description of the embodiments or the related art will be briefly introduced below. Obviously, the drawings in the following description illustrates only some embodiments of the present disclosure; and those of ordinary skill in the art can also obtain drawings of other embodiments according to these drawings, without paying any creative work.

DETAILED DESCRIPTION OF PREFERRED EMBODIMENTS

In order to facilitate the understanding of the disclosure, the disclosure will be described below comprehensively with reference to the drawings. The drawings show preferred embodiments of the disclosure. However, this disclosure can be implemented in many different ways, rather than being limited to the embodiments described herein. On the contrary, the embodiments are provided just for the purpose of providing thorough and comprehensive understanding of the disclosure.

The term "terminal device" used herein refers to, but is not limited to, devices that can be connected in any one or some of the following connections to receive and/or send communication signals:

(1) Wired connection, for example, the connection is established via Public Switched Telephone Networks (PSTN), Digital Subscriber Line (DSL), a digital cable, and a direct cable; and (2) Wireless connection, for example, the connection is established via cellular network, Wireless Local Area Network (WLAN), digital television network such as DVB-H network, satellite network, and AM-FM broadcast transmitter.

The terminal devices configured to communicate wirelessly may be referred to as "mobile terminals". Examples of mobile terminals include, but are not limited to, the following electronic devices:

(1) A satellite phone or cellular phone;

(2) A Personal Communications System (PCS) terminal that can incorporate a cellular radio telephone with capacities of data processing, fax and data communication;

(3) A radio telephone, pager, Internet/Intranet access, Web browser, note book, calendar, Personal Digital Assistant (PDA) equipped with a Global Positioning System (GPS) receiver;

(4) A conventional laptop and/or palmtop receiver; and (5) A conventional laptop and/or palmtop radio telephone transceiver, etc.

Figure 1:
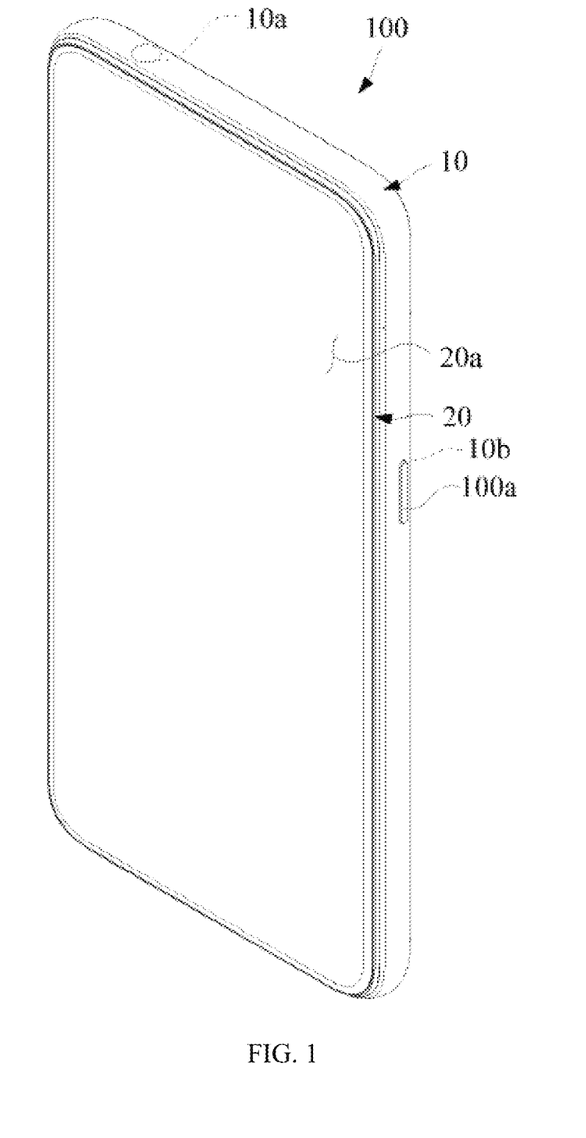
FIG. 1 is a perspective view of a mobile terminal provided by the embodiments of the disclosure.

Referring to FIG. 1, a mobile terminal 100 provided by the embodiments is shown. The mobile terminal 100 may be a smart phone, a computer, an IPAD or other electronic devices, which is not limited herein.

The mobile terminal 100 provided by the embodiments is illustrated by taking a mobile phone as an example. The mobile terminal 100 includes a housing 10 and a display screen 20. The display screen 20 can be installed on the housing 10, and the housing can also be used to accommodate electronic components of the mobile terminal 100, such as a battery and a mainboard. In the mobile terminal 100 shown in FIG. 1, after the display screen 20 is installed on the housing 10, an edge of the display screen 20 is substantially joined with an edge of the housing 10.

Figure 2:
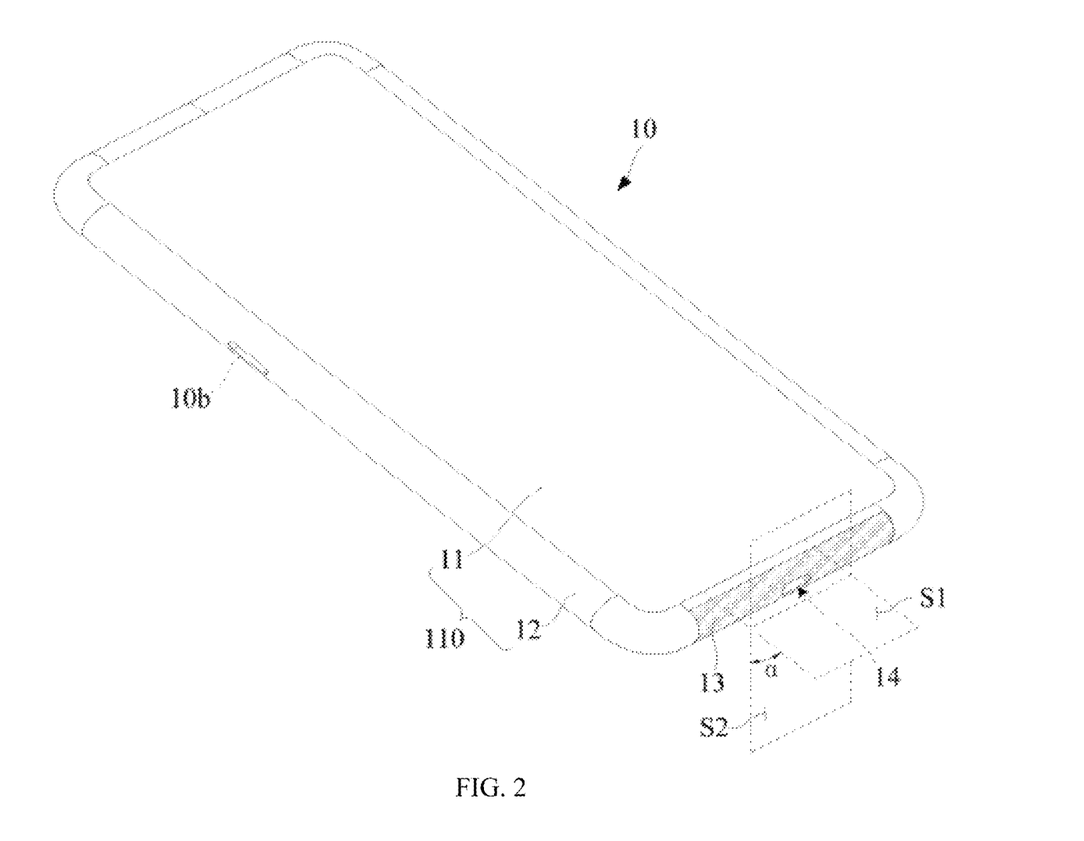
FIG. 2 is a schematic diagram illustrating a structure of a housing of the mobile terminal according an embodiment of the disclosure, in which a virtual first reference plane and a virtual second reference plane are correspondingly shown.
Figure 3:
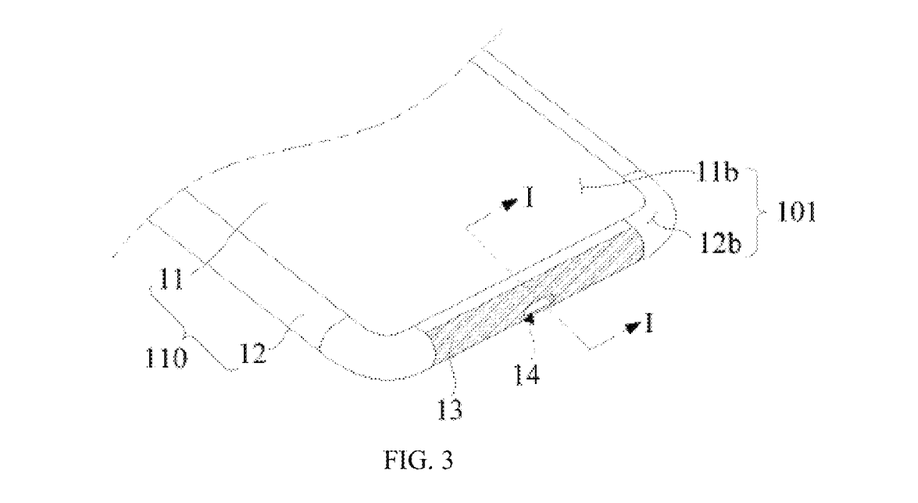
FIG. 3 is a schematic diagram illustrating a part of the structure of the housing shown in FIG. 2.
Figure 4:
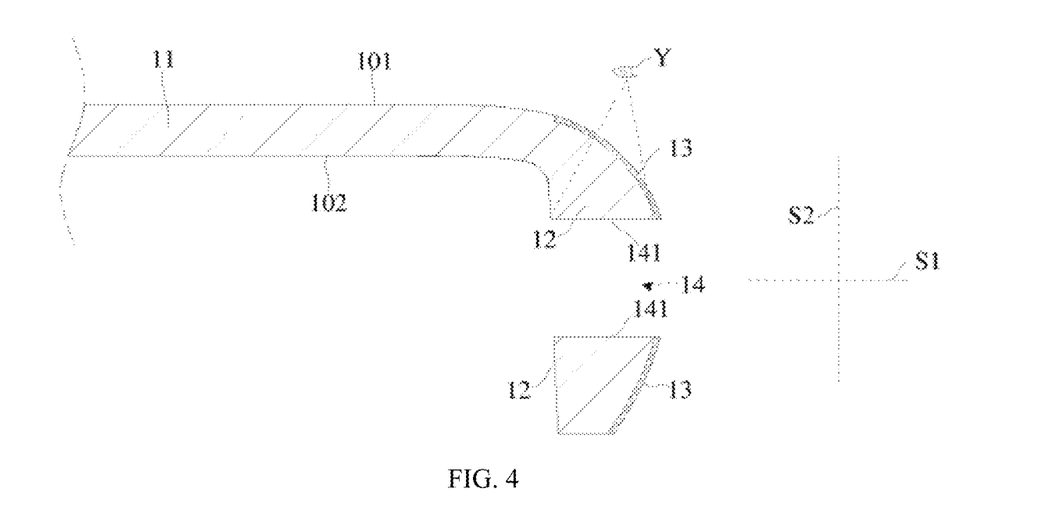
FIG. 4 is a schematic diagram illustrating a cross section taken along a middle line I-I shown in FIG. 3, in which the virtual first reference surface and second reference surface are correspondingly shown.

As shown in FIG. 2 to FIG. 4, the housing 10 includes a transparent main body 110 that is integrally formed. The transparent main body 110 has an outer surface 101 and an inner surface 102 opposite to each other. The inner surface 102 refers to a surface of the housing 10 which is invisible when the housing 10 is assembled on the mobile terminal 100. Correspondingly, the outer surface 101 is a surface of the housing 100 away from the interior of the mobile terminal 100, which defines a part of the surface of the mobile terminal 100. The transparent main body 110 may be made from transparent resin or plastic. In some implementations, the transparent main body 110 is made from a transparent polycarbonate material, transparent acrylic, or other transparent materials with excellent light transmission properties.

The transparent main body 110 includes a flat plate portion 11 and a side portion 12 connected to each other. The side portion 12 is disposed at the periphery of the flat plate portion 11 and encloses the flat plate portion 11. The side portion 12 is provided with at least one through hole 14. Each of the through hole 14 may be a hole provided on the housing 10 for exposing the corresponding functional structure of the mobile terminal 100. The location and the shape of each through hole 14 is set according to corresponding function structure of the mobile terminal 100. For example, the through hole 14 shown in FIG. 2 may be a USB interface hole for exposing a charging or data transmission interface of the mobile terminal 100. The through hole 14 penetrates the inner surface 102 and the outer surface 101. In other embodiments, for example, the through hole 14 may also be implemented as a hole for earphone jack 10a of the mobile terminal 100 shown in FIG. 1. For another example, as shown in FIG. 1 and FIG. 2, the through hole 14 may also be implemented as a hole for button 10b on the housing 10 that corresponds to a button 100a of the mobile terminal 100. The type of the through hole 14 is not limited herein.

For the convenience of description, the structure of the housing 10 will be further described below by taking a case where the through hole 14 shown in FIG. 2 corresponds to the charging or data transmission interface of the mobile terminal 100 as an example.

As shown in FIG. 3 and FIG. 4, a light-shielding layer 13 is provided at the outer surface 101 of the transparent main body 110. The light-shielding layer 13 is jointed with a side wall 141 of the through hole 14. Specifically, the light-shielding layer 13 extends along the outer surface 101 and is jointed with the side wall 141 of the through hole 14. That is, the light-shielding layer 13 extends along the outer surface 101 and is located around the through hole 14, and an end of the through hole 14 away from the inner surface 102 is connected to the light-shielding layer 13. In order to facilitate the definition of the arrangement of the light-shielding layer 13 and the side wall 141 of the through hole 14, in FIG. 2, a first virtual plane, i.e., a first reference plane S1, is schematically shown, and the first reference plane S1 is a geometric plane in parallel with the flat plate portion 11. An orthographic projection area of the side wall 141 of the through hole 14 on the first reference plane S1 is located within an orthographic projection area of the light-shielding layer 13 on the first reference plane S1. In other words, the orthographic projection area of the light-shielding layer 13 on the first reference plane S1 can cover and shield the orthographic projection area of the side wall 141 of the through hole 14 on the first reference plane S1. It should be noted that, when the housing 10 is mounted on the mobile terminal 100, a geometric plane perpendicular to a thickness direction of the mobile terminal 100 may also be defined as the first reference plane, and the arrangement of the light-shielding layer 13 also satisfies a condition that the orthographic projection area of the side wall 141 of the through hole 14 on the first reference plane S1 is located within the orthographic projection area of the light-shielding layer 13 on the first reference plane S1.

In the above embodiments, by means of the light-shielding layer 13 provided at the outer surface 101 of the transparent main body 110, the light is blocked. Specifically, the orthographic projection area of the light-shielding layer 13 on the first reference plane S1 covers the orthographic projection area of the side wall 141 of the through hole 14 on the first reference plane S1, in this way, the part of the transparent main body 110 that is provided with the light-shielding layer 13 has no optical transparency or has an extremely low light transmittance, and the side wall 141 of the through hole 14 cannot be observed through the part of the transparent main body 110 that is provided with the light-shielding layer 13, thereby preventing the overall visual effect of the housing 10 from being affected by the visibility of the side wall 141 of the through hole 14 through the transparent main body 110. For example, referring to FIG. 4, when it is observed at an observation point Y, due to the shielding of the light-shielding layer 13, external light cannot travel through the part of the transparent main body 110 that is provided with the light-shielding layer 13 to arrive at the side wall 141 of the through hole 14, thus the side wall 141 of the through hole 14 will not be irradiated and the side wall 141 of the through hole 14 is made invisible or has a low visibility, which has a negligible effect on the overall visual effect of the housing 10. In addition, in another aspect, by means of the light-shielding layer 13, light reflected or diffusely reflected by the side wall 141 can also be prevented from passing through the part of the transparent main body 110 that is provided with the light-shielding layer 13. As such, the provided light-shielding layer 13 can shield the side wall 141 of the through hole 14, and reduce the adverse effect on the outer surface 101 of the housing 10 that is caused by the visibility of the side wall 141 of the through hole 14 through the transparent main body 110, thereby improving the overall appearance and texture of the housing 10 and the user experience.

The part of the transparent main body 110 that is provided with the light-shielding layer 13 can be set according to requirements, as long as the side wall 141 of the through hole 14 can be shielded. For example, in some embodiments, on a side where the outer surface 101 is located, the side wall 141 of the through hole 14 may be completely shielded by the light-shielding layer 13. That is, the side wall 141 of the through hole 14 cannot be observed from the outer surface 101 of the housing 10. It should be noted that, with regard to the side wall 141 of the through hole 14 not being observed from the outer surface 101 of the housing 10, it means that, when the observation point Y is on the side where the outer surface 101 of the housing 10 is located, neither the part of the transparent main body 110 that is provided with the light-shielding layer 13 nor a part of the transparent main body 110 that is not provided with the light-shielding layer 13, enables the side wall 141 of the through hole 14 to be visible on the side where the outer surface 101 is located. With this arrangement, the part of the transparent main body 110 that is not provided with the light-shielding layer 13 may have a reduced light transmittance due to the accumulation of materials of the transparent main body 110 along a propagation path of light; accordingly, this enables the side wall 141 of the through hole 14 to be invisible through the transparent main body 110, or enables only a small amount of light reflected or diffusely reflected by the side wall 141 to pass through the transparent main body 110, which is insufficient to be visually observed by naked eyes.

In some embodiments, as shown in FIG. 4, all the light-shielding layer 13 is provided at the side portion 12, thereby preventing the side wall 141 of the through hole 14 from being visible through a part of the outer surface 101 corresponding to the side wall 141.

Figure 7:
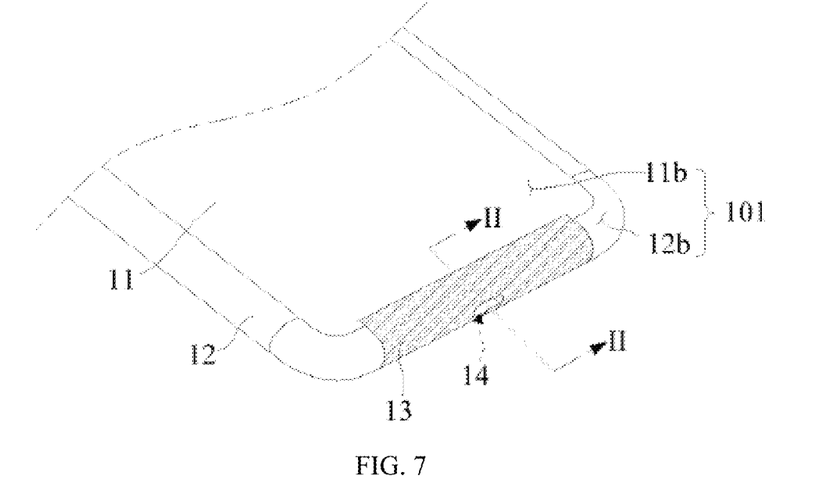
FIG. 7 is a schematic diagram illustrating a part of the structure of the housing according to another embodiment of the disclosure.
Figure 8:
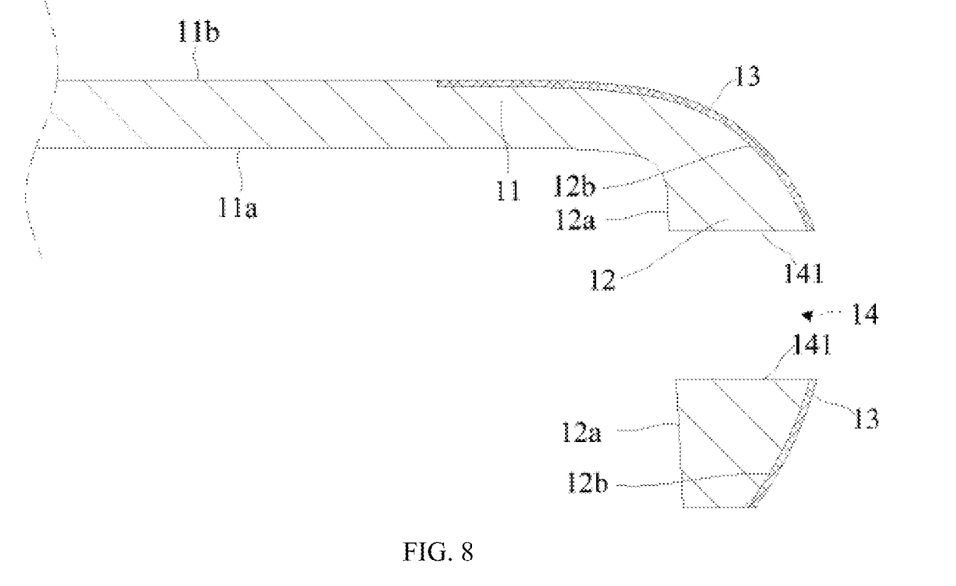
FIG. 8 is a schematic diagram illustrating a cross section taken along a middle line II-II shown in FIG. 7.

In other embodiments, as shown in FIG. 7 and FIG. 8, one part of the light-shielding layer 13 is provided at the flat plate portion 11, and the other part of the light-shielding layer 13 is provided at the side portion 12, thereby further improving the shielding of the side wall 141 of the through hole 14 by the light-shielding layer 13. Specifically, since one part of the light-shielding layer 13 is provided at the flat plate portion 11, the propagation path, along which the light reflected or diffusely reflected by the side wall 141 of the through hole 14 passes through the transparent main body 110 and exits from the part of the flat plate portion 11 that is not shielded by the light-shielding layer 13, is lengthened, and the possibility that the side wall 141 of the through hole 14 is visible through the flat plate portion 11 is reduced, thereby preventing the overall appearance and texture of the housing 10 from being influenced by the visibility of the side wall 141 of the through hole 14 at the outer surface 101 of the transparent main body 110. In addition, some texture or color can also be formed on the light-shielding layer 13, to achieve a good decorative effect and further improve the overall appearance and texture of the housing 10.

As shown in FIG. 2 and FIG. 4, a second reference plane S2 is defined by a geometric plane perpendicular to an extending direction of the through hole 14. It should be noted that the extending direction of the through hole 14 refers to a depth direction of the through hole 14 provided in the housing 10. For a hollow through hole 14, the extending direction can also be considered to be along an axis direction of the through hole 14. Specifically, the through hole 14 penetrates the inner surface 102 and the outer surface 101 along the extending direction.

Figure 5:
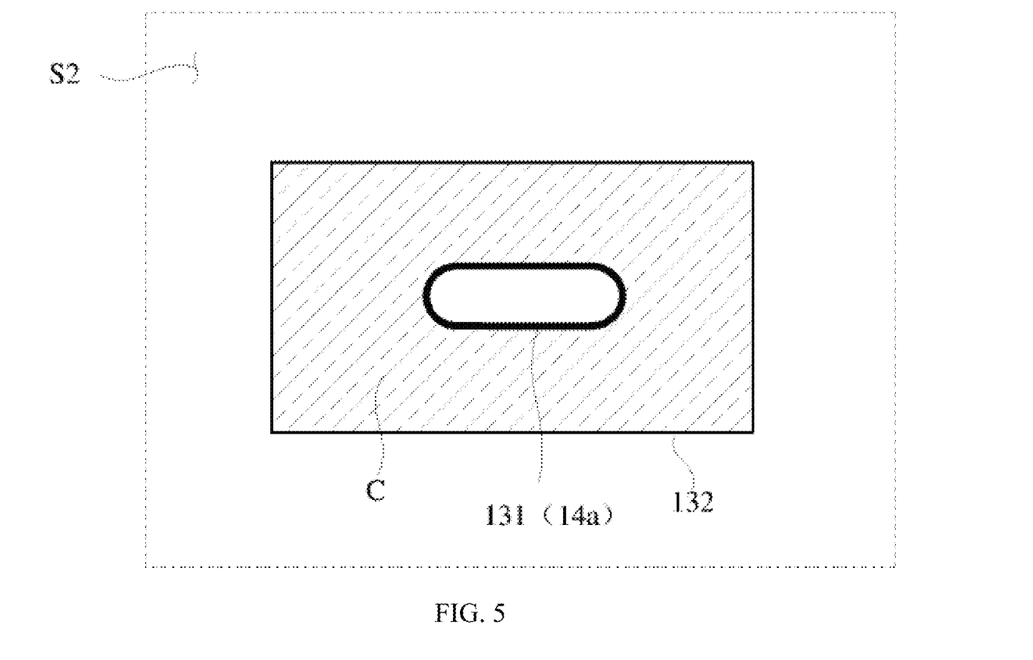
FIG. 5 is a schematic diagram illustrating orthographic projections of an inner wall of a through hole and a light-shielding layer on the second reference plane for the housing according to an embodiment of the disclosure.
Figure 6:
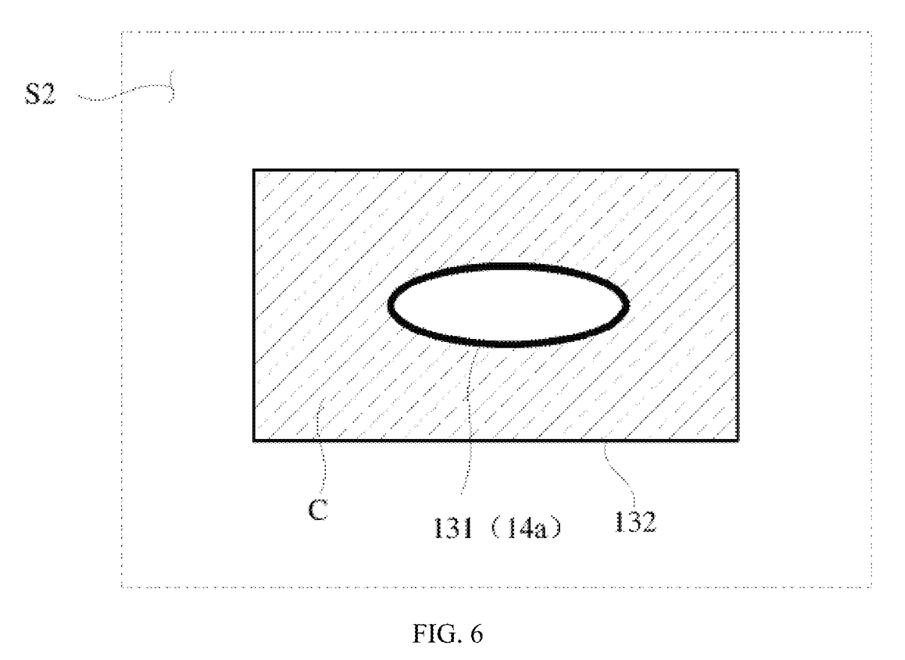
FIG. 6 is a schematic diagram illustrating orthographic projections of the inner wall of the through hole and the light-shielding layer on the second reference plane according to another embodiment of the disclosure.

As shown in FIG. 5 and FIG. 6, an orthographic projection of the side wall 141 of the through hole 14 on the second reference plane S2 defines a first contour line 14a, and the shape of the area enclosed by the first contour line 14a is the same as the shape of the cross section of the side wall 141 of the through hole 14 perpendicular to the extending direction. An orthographic projection of the light-shielding layer 13 on the second reference plane S2 defines an enclosed area. The enclosed area has an inner edge 131 and an outer edge 132. The inner edge 131 coincides with the first contour line 14a, and the inner edge 131 is located in an area enclosed by the outer edge 132.

As shown in FIG. 5, in some embodiments, the area enclosed by the inner edge 131 is oblong, and the area enclosed by the outer edge 132 is rectangular. As shown in FIG. 6, in other embodiments, the area enclosed by the inner edge 131 is elliptical, and the area enclosed by the outer edge 132 is rectangular. The through hole 14 serves as a hole in the housing 10 for exposing the functional structure of the mobile terminal 100, and the shape of the through hole 14 can be set according to actual requirements. For example, when the through hole 14 is used as a hole for earphone jack, the area enclosed by the first contour line 14a is circular, and the cross section of the through hole 14 is circular accordingly.

In some embodiments, the area enclosed by the outer edge 132 is rectangular, oblong or elliptical, such different shapes can adapt the overall appearance of the housing 10. The shape of the area enclosed by the outer edge 132 is not limited herein.

As shown in FIG. 2, an angle α between the first reference plane S1 and the second reference plane S2 is in a range from 85° to 95°. Since the extending direction of the through hole 14 is perpendicular to the second reference plane S2, and the flat plate portion 11 is substantially perpendicular to the second reference plane S2, the angle α between the first reference plane S1 and the second reference plane S2 being in the range from 85° to 95° means that, an angle at which the extending direction of the through hole 14 is inclined relative to the flat plate portion 11 is within an range from −5° to 5°, and the extending direction of the through hole 14 is substantially in parallel with the flat plate portion 11.

When the first reference plane S1 and the second reference plane S2 are perpendicular to each other, that is, the angle α is 90°, the extending direction of the through hole 14 is in parallel with the flat plate portion 11.

As shown in FIG. 7 and FIG. 8, the flat plate portion 11 has a first surface 11a and a second surface 11b opposite to each other. The side portion 12 has an inner peripheral surface 12a and an outer peripheral surface 12b opposite to each other. The first surface 11a and the inner peripheral surface 12a form a part or all of the inner surface 102, and the outer peripheral surface 12b is joined with the second surface 11b to form the outer surface 101. At least a part of the outer peripheral surface 12b is an arc surface, the through hole 14 penetrates the arc surface. The arc surface enables the edge of the housing 100 to be smooth.

Figure 9:
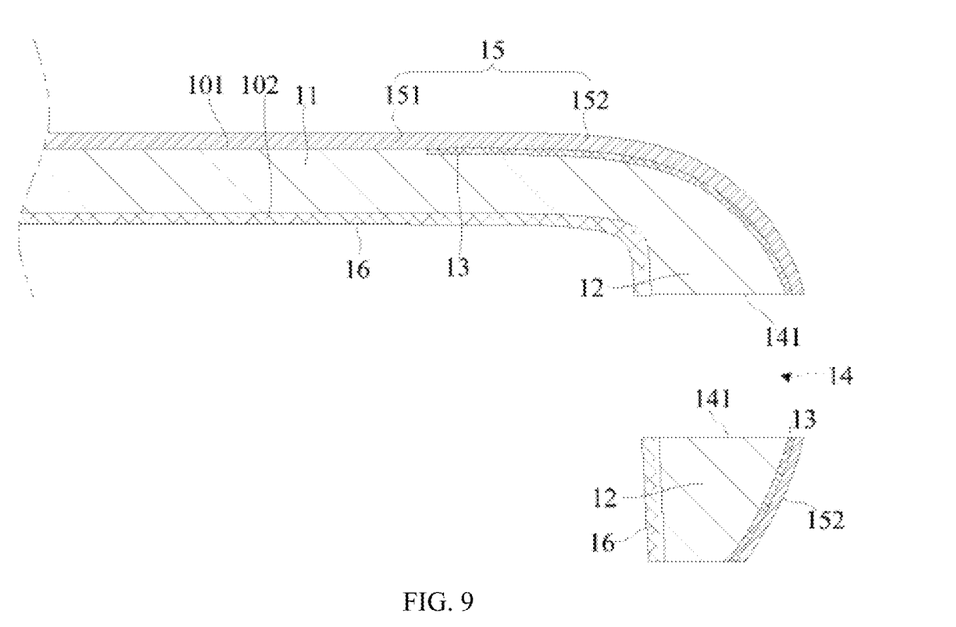
FIG. 9 is a schematic diagram illustrating a cross section of the housing according to another embodiment of the disclosure.

As shown in FIG. 9, in some embodiments, a transparent hardened layer 15 is formed, by means of surface treatment, on the side where the outer surface is located. Specifically, the transparent hardened layer 15 includes a first transparent hardened layer 151 and a second transparent hardened layer 152, and the second transparent hardened layer 152 is jointed with the first transparent hardened layer 151. The first transparent hardened layer 151 is disposed on the part of the outer surface 101 that is not provided with the light-shielding layer 13, and the second transparent hardened layer 152 is disposed on a side of the light-shielding layer 13 away from the transparent main body 110. With this arrangement, the surface strength of the housing 10 can be enhanced; in addition, the light-shielding layer 13 is sandwiched between the second transparent hardened layer 152 and the transparent main body 110, which prevents the light-shielding layer 13 from falling off the transparent main body 110, and thus prevents the overall appearance of the housing 10 from being influenced.

The transparent hardened layer 15 may be made from tempered glass, ordinary glass, transparent plastic or transparent rubber.

Referring to FIG. 9, a decorative layer 16 is disposed on the inner surface 102. The decorative layer 16 is made from an opaque material to prevent the internal structure of the mobile terminal 100 from being observed through the housing 10, and thus prevents the overall appearance and texture of the mobile terminal 100 from being influenced.

In some embodiments, the display screen 20 may be a Liquid Crystal Display (LCD) screen for information display. The LCD screen may be a Thin Film Transistor (TFT) screen, or an In-Plane Switching (IPS) screen, or a Splice Liquid Crystal Display (SLCD) screen.

In other embodiments, the display screen 20 may be an Organic Light-Emitting Diode (OLED) screen for information display. The OLED screen may be an Active Matrix Organic Light Emitting Diode (AMOLED) screen, or a Super Active Matrix Organic Light Emitting Diode (Super AMOLED) screen, or a Super Active Matrix Organic Light Emitting Diode Plus (Super AMOLED Plus) screen, which is not limited herein.

Figure 10:
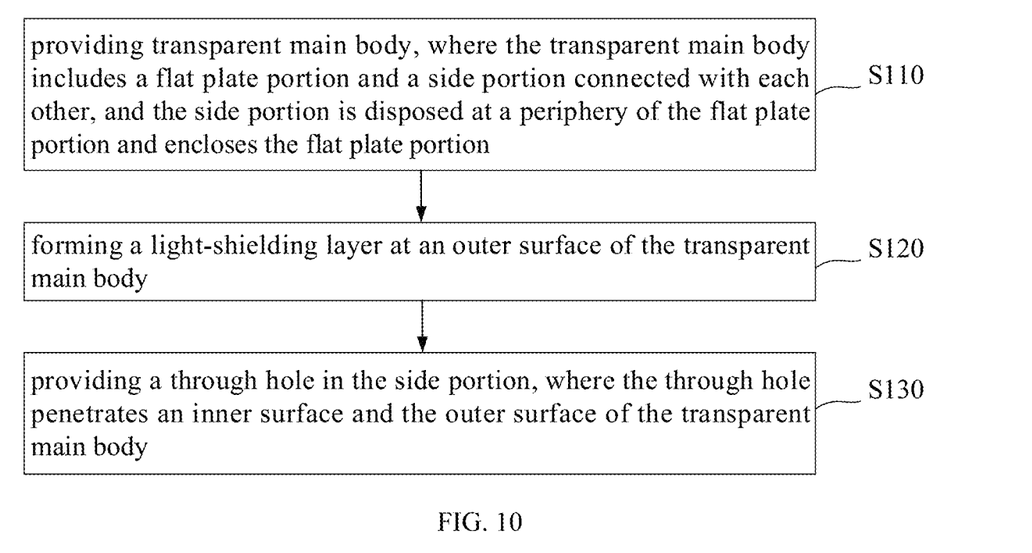
FIG. 10 is a flowchart of a method for manufacturing a housing according to an embodiment of the disclosure.

As shown in FIG. 10, a method for manufacturing the housing 10 is provided in the embodiments of the present disclosure, which includes the following operations S110 to S130:

At S110, a transparent main body 110 is provided, where the transparent main body 110 includes a flat plate portion 11 and a side portion 12 connected with each other, and the side portion 12 is disposed at a periphery of the flat plate portion 11 and encloses the flat plate portion;

At S120, a light-shielding layer 13 is formed at an outer surface 101 of the transparent main body 110; and At S130, a through hole 14 is provided in the side portion 12, where the through hole 14 penetrates an inner surface 102 and the outer surface 101 of the transparent main body 110.

The light-shielding layer 13 is jointed with a side wall 141 of the through hole 14. An orthographic projection area of the light-shielding layer 13 on a first reference plane S1 covers an orthographic projection area of the side wall 141 of the through hole 14 on the first reference plane S1, and the first reference plane S1 is a geometric plane in parallel with the flat plate portion 11.

With the housing 10 manufactured according to the method for manufacturing the housing 10, the side wall 141 of the through hole 14 can be shielded by means of the light-shielding layer 13, and the overall appearance and texture of the housing 10 can thus be prevented from being influenced by the visibility of the side wall 141 of the through hole 14 through the transparent main body 110.

In an embodiment, the operation of forming the light-shielding layer 13 at the outer surface 101 of the transparent main body 110 includes:

Transferring ink to the outer surface 101 of the transparent main body 110 by means of a screen printing process, to form the light-shielding layer 13. Specifically, by means of the screen printing process, that is, by applying ink onto a screen plate provided with characters or patterns in advance and applying a pressure thereto, the ink can be transferred, through screen printing, pad printing, transfer printing, or printing, to the outer surface 101 of the transparent main body 110, so as to form the light-shielding layer 13 on the outer surface 101 of the transparent main body 110.

The thickness of the light-shielding layer 13 is in a range from 0.02 mm to 0.04 mm. Within such range, the light-shielding layer is not too thin to easily cause light leakage which would otherwise affect the shielding effect, and in another aspect, the light-shielding layer is not too thick to account for a large proportion of the total thickness of the housing 10 which would otherwise have an adverse effect on the overall structural strength of the housing 10.

In some embodiments, the thickness of the light-shielding layer 13 is 0.02 mm. In other embodiments, the thickness of the light-shielding layer 13 may be 0.04 mm. In some embodiments, the thickness of the light-shielding layer 13 may be 0.03 mm. The thickness of the light-shielding layer 13 can be set according to the overall thickness of the housing 10, which is not limited herein.

The transparent main body 110 is integrally formed by an injection molding process with a transparent material.

In some embodiments, a cavity of a mold adopted for forming the transparent main body 110 has raised grains. When the transparent main body 110 is formed by using the mold, the light-shielding layer 13 is formed by the transparent material filled into the recess formed between the raised grains.

A depth of the recess formed between the raised grains is in a range from 0.01 mm to 0.05 mm, so that the light-shielding layer 13, formed by the transparent material that is filled into the recess formed between the raised grains, has an appropriate thickness.

The through hole 14 may be provided on the side portion 12 by removing a part of the side portion 12 with fine machining of a Computer Number Control (CNC) machine tool. The through hole 14 may also be formed on the side portion 12 by laser cutting. In other embodiments, during the process of forming the transparent main body 110 by the injection molding process, an insert is placed and maintained at the position where the through hole 14 is to be provided, to block the transparent material from being injected at this position; and after the injection molding process, the insert is removed, and thus the through hole 14 is formed.

It should be noted that, the light-shielding layer 13 may be formed, by the screen printing process, on the outer surface 101 of the transparent main body 110 that has been molded, or the light-shielding layer 13 may be formed during the molding process of the transparent main body 110.

Figure 11:
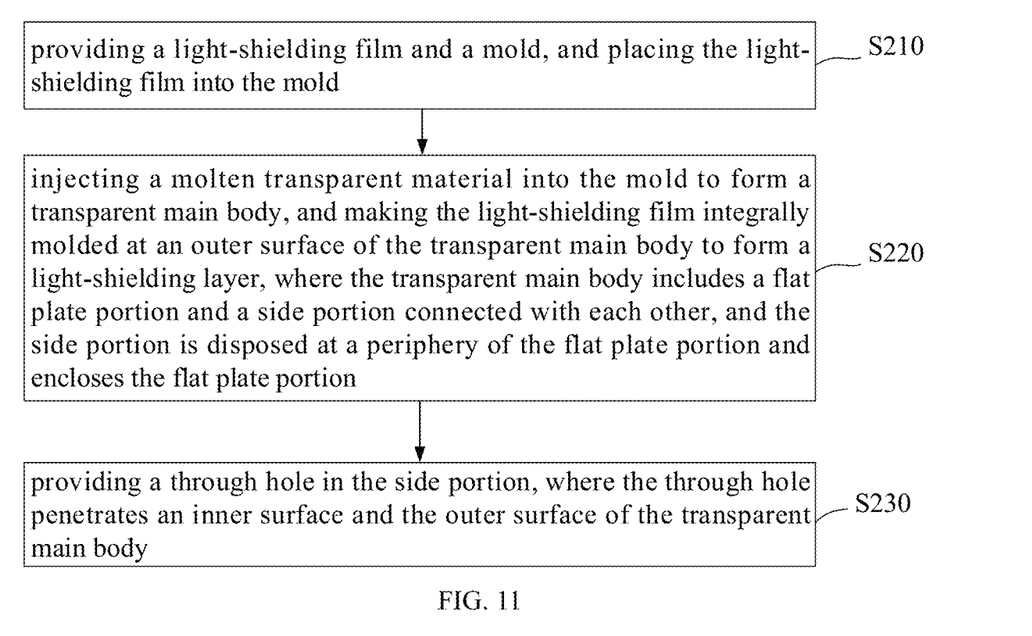
FIG. 11 is a flowchart of a method for manufacturing a housing according to another embodiment of the disclosure.

As shown in FIG. 11, another method for manufacturing the housing 10 is provided in the embodiments of the present disclosure, which includes operations S210 to S230 as follows:

At S210, a light-shielding film and a mold are provided, and the light-shielding film is placed into the mold;

At S220, a molten transparent material is injected into the mold to form a transparent main body 110, and the light-shielding film is made integrally molded at an outer surface 101 of the transparent main body 110 to form a light-shielding layer 13, where the transparent main body 110 includes a flat plate portion 11 and a side portion 12 connected with each other, and the side portion 12 is disposed at a periphery of the flat plate portion 11 and encloses the flat plate portion; and At S230, a through hole 14 is provided in the side portion 12, where the through hole 14 penetrates an inner surface 102 and the outer surface 101 of the transparent main body 110.

The light-shielding layer 13 is jointed with a side wall 141 of the through hole 14. An orthographic projection area of the light-shielding layer 13 on a first reference plane S1 covers an orthographic projection area of the side wall 141 of the through hole 14 on the first reference plane S1, and the first reference plane S1 is a geometric plane in parallel with the flat plate portion 11.

In some embodiments, the light-shielding layer 13 is formed by making the light-shielding film integrally molded to the transparent main body 110, the stability of connection between the light-shielding layer 13 and the transparent main body 110 is effectively improved. In addition, an operation of attaching the light-shielding film onto the transparent main body 110 is omitted, which improves the processing efficiency. It should be noted that, in S210, the light-shielding film is located on a side surface of the mold, and the position where the light-shielding film is placed on the mold depends on the position of a function structure of the mobile terminal to be exposed. In addition, since the side wall 141 of the through hole 14 can be shielded by the light-shielding layer 13 that is formed by making the light-shielding film integrally molded at the outer surface 101 of the transparent main body 110, the overall appearance and texture of the housing 10 is prevented from being influenced by the visibility of the side wall 141 of the through hole 14 through the transparent main body 110, which makes the appearance of the housing 10 look more beautiful.

The light-shielding layer 13 formed by means of the light-shielding film can also provide a good decorative effect. Specifically, when the part of the housing 10 that is provided with the light-shielding layer 13 is observed from outside of the housing 10, the light-shielding layer 13 and the other part of the transparent main body 110 that are not provided with the light-shielding layer 13 form a pattern or a color difference is formed therebetween, which makes the housing 10 more beautiful.

Figure 12:
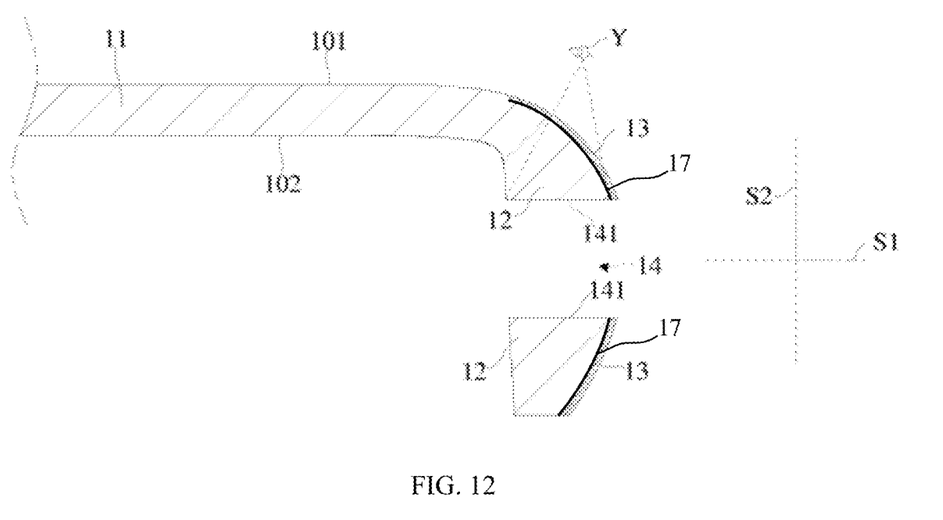
FIG. 12 is another schematic diagram illustrating the cross section taken along the middle line I-I shown in FIG. 3, in which an ink layer between the light-shielding layer and the transparent main body is shown.

In some embodiments, an ink layer 17 (as shown in FIG. 12) is printed on the light-shielding film, and the ink layer 17 is located between the light-shielding film and the transparent main body 110. The ink layer 17 enables the adhesion between the light-shielding film and the transparent main body 110 after the molding to be improved. In addition, the ink layer 17 can provide a good decorative effect. For example, a colorful ink layer may be formed with inks of different colors. Alternatively, an ink layer of a relatively uniform color may be formed with an ink of a single color, for example, the ink layer 17 may be red, black, or green.

The thickness of the ink layer 17 is set within a reasonable range, for example, the thickness of the ink layer 17 is in a range from 0.05 mm to 0.1 mm.

The thickness of the light-shielding film may be in a range from 0.02 mm to 0.04 mm, so that the formed light-shielding layer 13 is in an appropriate thickness range. Thus, the light-shielding layer 13 is prevented from being too thick to affect the stack structure of the layers in a thickness direction of the housing 10, in addition, the light-shielding layer 13 is prevented from being too thin to weaken the shielding effect on the side wall 141 of the through hole 14.

It should be noted that the inner surface 102 and the outer surface 101 of the housing 10 can be processed to form corresponding layer structures.

For example, in some embodiments, before the operation of providing the through hole 14 in the side portion 12, the method also include operations as follows:

Forming a decorative layer 16 on the inner surface 102 of the transparent main body 110, where the decorative layer 16 is made of an opaque material. The opaque material may be ink, and the ink is printed, by the screen printing technology, on the inner surface 102 of the transparent main body 110 to form the decorative layer 16. Alternatively, the opaque material may be silicon titanium, niobium, tin, indium, or aluminum oxide, etc. The opaque material is attached, by plating, onto the inner surface 102 of the transparent main body 110 to form the decorative layer.

The decorative layer 16 is made of the opaque material, which can effectively prevent a side of the inner surface 102 from being observed from the outer surface 101 of the housing 10 through the housing 10. Specifically, with this arrangement, when the housing 10 is assembled on the mobile terminal 100, the internal structure of the mobile terminal 100 cannot be observed through the part of the housing 10 where the decorative layer 16 is formed, thereby preventing such visibility from affecting the overall appearance and texture of the mobile terminal 100. Of course, it is possible to selectively form the decorative layer 16 on a part of the inner surface 102 and retain the perspectivity of a part of the housing 10. In this case, the decorative layer 16 can be used to shield a part of the mobile terminal 100 that has a negative effect on the overall aesthetics of the mobile terminal 100; and at the same time, a part of the internal structure of the mobile terminal 100 can be observed from the part of the housing 10 where the decorative layer is not provided, which is beneficial to enhance the overall beauty of the mobile terminal 100. For example, the perspectivity of a part of the housing 10 corresponding to a processor is retained, but other parts are shielded by the decorative layer 16, so that the texture of the processor is visible through the transparent main body 110 to enhance the visual effect of the appearance of the housing 10.

In some embodiments, before the operation of providing the through hole 14 in the side portion 12, the method also includes the following operations:

Forming a transparent hardened layer through surface hardening treatment, the transparent hardened layer includes a first transparent hardened layer 151 and a second transparent hardened layer 152 jointed with each other. The first transparent hardened layer 151 is overlaid on a part of the outer surface 101 of the transparent main body 110 that is not provided with the light-shielding layer 13, and the second transparent hardened layer 152 is overlaid on a side of the light-shielding layer 13 away from the transparent main body 110.

The transparent hardened layer formed by the surface hardening treatment satisfies the requirement for light transmission on one hand, and can enhance the surface strength of the housing 10 on the other hand. In addition, after such treatment, the light-shielding layer 13 is sandwiched between the second transparent hardened layer 152 and the transparent main body 110, thereby preventing the light-shielding layer 13 from falling off the transparent main body 110 which would otherwise affect the overall beauty of the housing 10.

The technical features of the above-mentioned embodiments may be combined arbitrarily. In order to simplify the description, all possible combinations of the various technical features in the above-mentioned embodiments are not described. However, any combination of these technical features, made without causing contradiction therebetween, should be considered as falling within the scope of the description.

The above-mentioned embodiments only illustrate several embodiments of the present disclosure, and the description thereof is relatively specific and detailed, which however should not be understood as limiting the scope of the present disclosure. It should be pointed out that, several modifications and improvements can also be made by those of ordinary skill in the art without departing from the concept of the present disclosure, all which fall within the scope of protection of the present disclosure. Therefore, the scope of protection of the present disclosure should be subject to the appended claims.

What is claimed is:

1. A housing, for a mobile terminal, the housing comprising:
    a transparent main body, wherein the transparent main body has an outer surface and an inner surface opposite to each other, the transparent main body comprises a flat plate portion and a side portion connected with each other, the side portion is disposed at a periphery of the flat plate portion and encloses the flat plate portion, and the side portion is provided with a through hole penetrating both the inner surface and the outer surface; and
    a light-shielding layer provided at the outer surface of the transparent main body, wherein the light-shielding layer is located around the through hole, and an end of a side wall of the through hole that is away from the inner surface is connected to the light-shielding layer, an orthographic projection area of the side wall of the through hole on a reference plane is located within an orthographic projection area of the light-shielding layer on the reference plane, and the reference plane is a geometric plane in parallel with the flat plate portion.

2. The housing according to claim 1, wherein all the light-shielding layer is provided at the side portion; or
    wherein one part of the light-shielding layer is provided at the flat plate portion and another part of the light-shielding layer is provided at the side portion.

3. The housing according to claim 1, wherein a first transparent hardened layer is disposed on a part of the outer surface that is not provided with the light-shielding layer, a second transparent hardened layer is disposed on a side of the light-shielding layer that is away from the transparent main body, and the second transparent hardened layer is jointed with the first transparent hardened layer.

4. The housing according to claim 1, wherein the through hole penetrates the inner surface and the outer surface along an extending direction of the through hole, an orthographic projection of the side wall of the through hole on an another reference plane defines a first contour line, the another reference plane is a geometric plane perpendicular to the extending direction, the reference plane and the another reference plane are perpendicular to each other; and
    an orthographic projection of the light-shielding layer on the another reference plane defines an enclosed area, the enclosed area has an inner edge and an outer edge, the inner edge coincides with the first contour line, and the inner edge is located in an area enclosed by the outer edge.

5. The housing according to claim 4, wherein an area enclosed by the inner edge is elliptical, oblong or circular, and the area enclosed by the outer edge is rectangular, oblong or elliptical.

6. The housing according to claim 1, wherein a decorative layer is provided on at least a part of the inner surface, and the decorative layer is made of an opaque material.

7. The housing according to claim 1, wherein the flat plate portion has a first surface and a second surface opposite to each other, the side portion has an inner peripheral surface and an outer peripheral surface opposite to each other, the first surface and the inner peripheral surface together form a part or all of the inner surface, the outer peripheral surface and the second surface are joined to form the outer surface, at least a part of the outer peripheral surface is an arc surface, and the through hole penetrates the arc surface.

8. The housing according to claim 1, wherein a thickness of the light-shielding layer is in a range from 0.02 mm to 0.04 mm.

9. A method for manufacturing a housing, the housing being applicable to a mobile terminal, the method comprising:
    providing a transparent main body, wherein the transparent main body has an outer surface and an inner surface opposite to each other, the transparent main body comprises a flat plate portion and a side portion connected with each other, and the side portion is disposed at a periphery of the flat plate portion and encloses the flat plate portion;
    forming a light-shielding layer at the outer surface of the transparent main body; and
    providing a through hole in the side portion, the through hole penetrating both the inner surface and the outer surface;
    wherein the light-shielding layer is located around the through hole and an end of a side wall of the through hole that is away from the inner surface is connected to the light-shielding layer, an orthographic projection area of the light-shielding layer on a reference plane covers an orthographic projection area of the side wall of the through hole on the reference plane, and the reference plane is a geometric plane in parallel with the flat plate portion.

10. The method according to claim 9, wherein the forming a light-shielding layer at an outer surface of the transparent main body comprises:
    transferring, by a screen printing process, ink to the outer surface of the transparent main body, to form the light-shielding layer.

11. The method according to claim 9, wherein the providing a transparent main body comprises:
    integrally forming the transparent main body by an injection molding process with a transparent material.

12. The method according to claim 11, wherein a cavity of a mold adopted for forming the transparent main body has raised gains, and the forming a light-shielding layer at the outer surface of the transparent main body comprises:
    during the forming of the transparent main body with the mold, filling the transparent material into a recess formed between the raised gains to form the light-shielding layer at the outer surface of the transparent main body.

13. The method according to claim 12, wherein a depth of the recess formed between raised grains is in a range from 0.01 mm to 0.05 mm.

14. The method according to claim 9, wherein before the through hole is provided in the side portion, the method further comprises:
    forming a decorative layer on the inner surface of the transparent main body, wherein the decorative layer is made of an opaque material.

15. The method according to claim 9, wherein before the through hole is provided in the side portion, the method further comprises:
    forming a transparent hardened layer through surface hardening treatment, wherein the transparent hardened layer comprises a first transparent hardened layer and a second transparent hardened layer joined with each other, the first transparent hardened layer is disposed on a part of the outer surface of the transparent main body that is not provided with the light-shielding layer, and the second transparent hardened layer is disposed on a side of the light-shielding layer far away from the transparent main body.

16. The method according to claim 9, wherein the providing a transparent main body and forming a light-shielding layer at the outer surface of the transparent main body, comprises:
    providing a light-shielding film and a mold, and placing the light-shielding film into the mold; and
    injecting a molten transparent material into the mold to form a transparent main body, and making the light-shielding film integrally molded at the outer surface of the transparent main body to form a light-shielding layer.

17. The method according to claim 16, wherein the providing a light-shielding film comprises:
    providing a light-shielding film on which an ink layer is printed, wherein the ink layer is located between the light-shielding film and the transparent main body after the forming of form the transparent main body, and a thickness of the ink layer is in a range from 0.05 mm to 0.1 mm.

18. A mobile terminal, comprising:
    a display screen; and
    a housing on which the display screen is installed, the housing comprising:
        a transparent main body integrally formed, wherein the transparent main body comprises a flat plate portion and a side portion connected with each other, the side portion is disposed at a periphery of the flat plate portion and encloses the flat plate portion, the side portion is provided with at least one through hole penetrating both an inner surface and an outer surface of the housing; and
        a light-shielding layer provided at the outer surface of the transparent main body, wherein the light-shielding layer is located around the at least one through hole and an end of a side wall of the at least one through hole that is away from the inner surface is connected to the light-shielding layer, an orthographic projection area of the side wall of the at least one through hole on a reference plane is located within an orthographic projection area of the light-shielding layer on the reference plane, and the reference plane is a geometric plane in parallel with the flat plate portion.

19. The mobile terminal according to claim 18, wherein at least a part of light-shielding layer is provided at the side portion.

20. The mobile terminal according to claim 18, wherein a first transparent hardened layer is disposed on a part of the outer surface that is not provided with the light-shielding layer, a second transparent hardened layer is disposed on a side of the light-shielding layer that is away from the transparent main body, and the second transparent hardened layer is jointed with the first transparent hardened layer; and
    a decorative layer is provided on at least a part of the inner surface, and the decorative layer is made of an opaque material.

* * * * *